Sept. 21, 1965  E. W. JOHNSON  3,207,523
SEAL ASSEMBLY
Filed Jan. 26, 1965

Everett W. Johnson,
INVENTOR.

BY

ATTORNEYS.

United States Patent Office 3,207,523
Patented Sept. 21, 1965

3,207,523
SEAL ASSEMBLY
Everett W. Johnson, 6306 Bovey Ave., Reseda, Calif.
Filed Jan. 26, 1965, Ser. No. 431,241
3 Claims. (Cl. 277—188)
(Granted under Title 35, U.S. Code (1952), sec. 266)

The invention described herein may be manufactured and used by or for the Government for governmental purposes without the payment of any royalty thereon.

This application is a continuation-in-part of application Serial Number 133,532 filed August 23, 1961.

This invention relates to seals for pipes, flanges, ducts and the like and more particularly to a seal assembly of the self-sealing type.

There is a constant search for seals, especially in connection with missile work, which can successfully withstand both extreme high and low pressures and temperatures in both the missile supporting ground equipment and on the missiles themselves. This is especially true where a liquid rocket engine is employed. Hypersonic speeds achieved by missiles cause air friction to heat surfaces to 1000° F. in a few seconds, while LOX drops metals to frigid lows of −300° and cold refrigerated air roars through various areas of the missile during flight. Therefore, during the flight, it is vital that the connections between pipes, flanges, ducts and lines be effectively sealed against leakage to insure the prescribed performance of the missile. It is of equal importance that the supporting ground equipment have leakproof connections to effectively operate under extreme variations in pressure and temperature.

To this end, the present invention addresses itself to a temperature insensitive, conduit seal assembly for both high and low pressure application which will insure against leakage of fluids through the seal.

Further objects of this invention are to provide an effective seal assembly which will be self-compensating to conform to small imperfections in the adjoining surfaces of the members to be secured together, will accommodate misalignment of the members to be joined, can be readily installed and removed under field conditions, can be reused repeatedly without reconditioning, and be substantially free from damage due to solid particle contaminants in the fluids carried through the conduit formed by the joined members.

Still another object is to provide a seal assembly which is simple in construction, inexpensive to manufacture, rugged in use under conditions of field use and readily adaptable to fabrication without special tooling.

Other objects and advantages will become apparent from the following detailed description, forming the specification, and taken in conjunction with the accompanying drawings in which.

Figure 1:
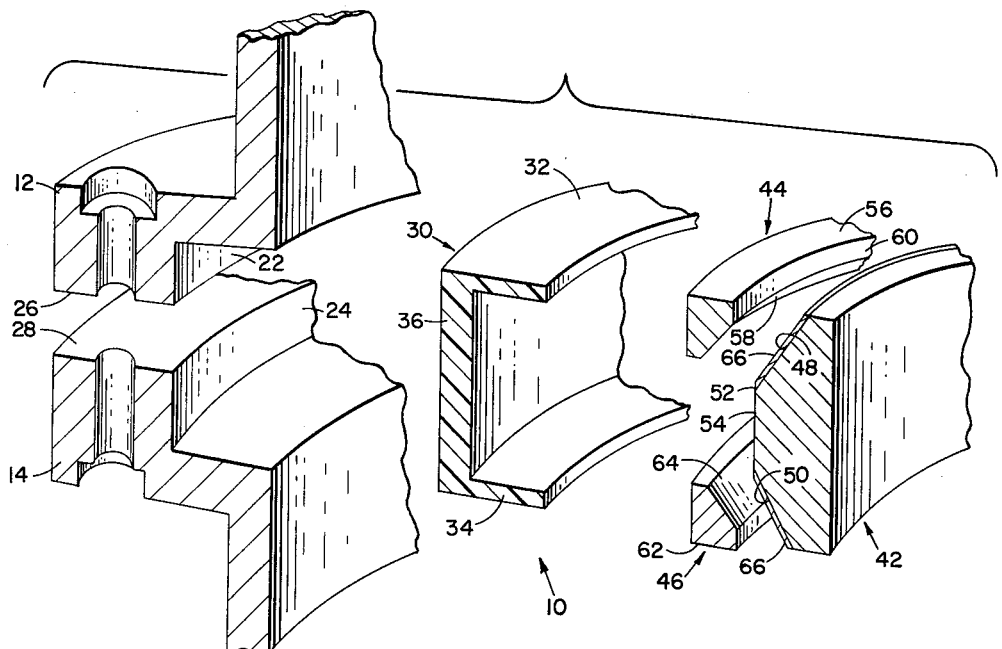
FIGURE 1 is an exploded perspective view of the seal assembly of this invention, shown in transverse or vertical cross section and broken away at one end, and showing a portion of a pair of flanges between which the seal assembly may be arranged.
Figures 2, 3:
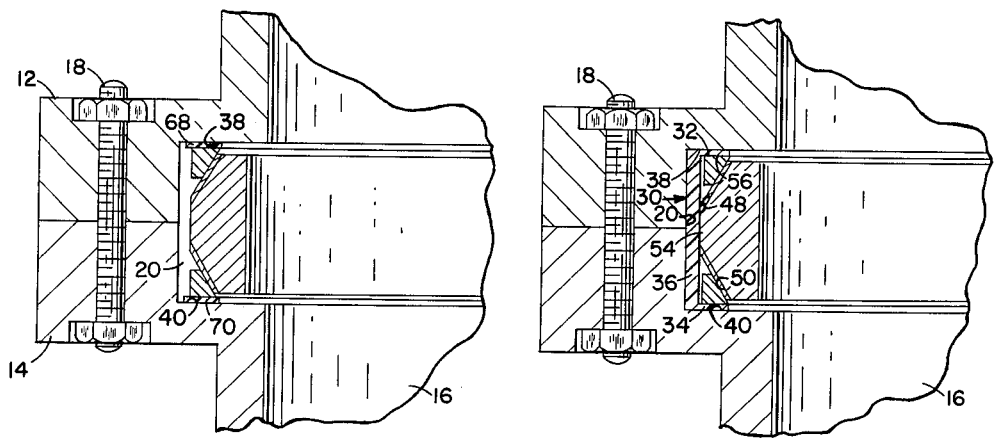
FIGURE 2 is a partial vertical cross sectional view with the seal assembly of FIGURE 1 in its assembled position between the flanges.
FIGURE 3 is a vertical cross sectional view similar to FIGURE 2, showing a modified form of the seal assembly.

With continued reference to the drawing, there is shown in FIGURES 1 and 2, one form of a seal assembly, generaly indicated at 10, constructed in accordance with the concept of the present invention. The seal assembly 10 is adapted to fit between two elements, flanges 12 and 14 of a conduit 16, to be secured together as by bolts 18 (FIGURE 2) to provide a leakproof joint between the flanges.

In the drawing, the seal assembly 10 is shown, for purposes of illustration and not of restriction, as being inserted in an internal annular groove 20 (FIGURE 2) formed by a pair of oppositely disposed annular recesses 22 and 24 (FIGURE 1) when the mating surfaces 26 and 28 of respective flanges 12 and 14 are secured together. The seal assembly 10 comprises a U-shaped endless member 30, preferably made of "Teflon," to provide along opposite legs thereof a pair of annular gaskets 32 and 34 connected together along one edge by an integrally formed web 36 extending perpendicularly therebetween. As seen in FIGURE 2, one gasket 32 is disposed along the wall 38 of the groove 20 and the other gasket 34 similarly lies along the opposite wall 40 of the groove.

In order to maintain the gaskets 32 and 34 in sealing contact against the respective groove walls 38 and 40, the seal assembly 10 includes three metal endless rings 42, 44 and 46, preferably having corrosion resistant properties, arranged to provide an interference fit. Endless ring 42 can be designated as the inner ring and endless rings 44 and 46 as the first and second outer rings respectively. Inner ring 42 has a pair of oppositely disposed beveled surfaces 48 and 50 on one side 52 receding as they incline away from adjacent the flat center portion 54 on the one side 52. The first outer ring 44 is disposed, in the operative position (FIGURE 2) with its upper, flat surface 56 in abutting, face-to-face relation with the gasket 32. The ring 44 is provided with a surface 58 (FIGURE 1) on one side 60 inclined to mate with and ride along the beveled surface 48 on the inner ring 42. The second outer ring 46 is similarly shaped but oppositely disposed so that its lower flat surface 62 is in abutting, face-to-face contact with the other gasket 34 while its rear inclined surface 64 is in mating contact with and adapted to ride along the beveled surface 50 of the inner ring 42.

To assure accommodation of the seal to surface imperfections of the seal groove as well as to permit lateral movement resulting from temperature and pressure differences, a "Teflon" film impregnation can be provided on the metal mating surfaces 56 and 62 of the outer rings instead of gaskets 32 and 34.

Thus, it will be seen that when the seal assembly 10 is inserted into the annular groove 20, the first and second outer rings are in mutual opposition with respect to the inner ring as the flanges 12 and 14 move toward each other as they are being secured together.

To prevent the possibility of abrading or galling of the mating inclined surfaces 48, 58 and 50, 64, a different metal 66 is used on the surfaces 48 and 50. This can be effectively accomplished by hard chrome plating or anodizing the surfaces 48 and 50.

Installation of the seal assembly in the manner described will result in an interference fit between the two outer rings and the inner ring so as to insure an effective seal between the gaskets 32 and 34 and the respective outer flat surfaces 56 and 62 of the outer rings. The provision of the U-shaped member 30 eliminates possible leakage from the joint formed between the flanges by the seeepage of fluid between the mating inclined surfaces 48, 58 and 50, 64.

The modified form of the seal assembly shown in FIGURE 3 is the same as shown in FIGURES 1 and 2, except that the web portion 36 extending between the gaskets 32 and 34 has been eliminated and separate, individual "Teflon" gaskets 68 and 70 are employed. The gaskets 68 and 70 may be bonded, in any suitable manner, to the opposite walls 38 and 40 of the annular groove 20.

It is to be noted that as the flanges 12 and 14 are being secured together, the pressure upon the seal assembly caused by the bringing together of the flanges, to form a joint, places the outer rings in tension and the inner ring in compression so that the three rings have a self-sealing action between them and between the outer rings and the gaskets due to the mutual opposition of the tension and compression forces. In this latter connection, the angle of contact between the mating surfaces of the outer rings and the inner ring may be selectively varied to provide the desired distribution of force between the seal assembly and the walls of the annular groove formed in the secured together flanges.

While there is shown and described the preferred embodiments of the invention, it is to be understood that the structure is susceptible to change and modification within the practicality of the invention and therefore should be limited only by the scope of the claims appended hereto.

I claim:

1. A seal assembly for insertion into an internal annular groove provided at mating surfaces of a pair of fluid conduits having flanges to be secured together, said assembly comprising an annular flat gasket made of plastic material and disposed along each of the opposite walls of said annular groove, an endless inner metal compression ring having a center opening therethrough, disposed to be in intimate contact with fluid flow therethrough from one conduit to the other, and a pair of oppositely disposed beveled surfaces on one side thereof receding as they extend away from adjacent the center of said one side, said surfaces being hard chrome plated to provide effective seal surfaces, a first endless outer ring having a flat surface disposed in abutting relation with one of said gaskets and further having a surface on one side thereof inclined to mate to one of said beveled surfaces, a second endless outer ring having a flat surface disposed in abutting relation with the other of said gaskets and further having a surface on one side thereof in mating face-to-face contact with the other of said beveled surfaces, whereby said seal assembly is adapted to be received in said internal annular groove of said conduit flanges and when said flanges are clamped together, to place said first and second outer rings in tension and said inner ring in compression to provide a leakproof seal between the conduit flanges and between the inner and outer rings under high and low temperature conditions.

2. A seal assembly as set forth in claim 1, wherein said gaskets form the opposite legs of a U-shaped member disposed within said annular groove.

3. A seal assembly as set forth in claim 1, wherein each of said annular flat gaskets is secured to one of said opposite walls of said annular groove.

References Cited by the Examiner

UNITED STATES PATENTS

| | | | |
|---|---|---|---|
| 2,641,381 | 6/53 | Bertrand | 277—188 X |
| 2,931,671 | 4/60 | Beeley | 277—145 X |
| 3,033,582 | 5/62 | Creavey | 277—207 X |

FOREIGN PATENTS 10,962  1908  Great Britain.

SAMUEL ROTHBERG, *Primary Examiner.*